United States Patent Office 3,658,753
Patented Apr. 25, 1972

3,658,753
COLOR STABILIZED POLY(ARYLENE SULFIDE) RESINS
Jerry O. Reed and James S. Dix, Bartlesville, Okla., assignors to Phillips Petroleum Company
No Drawing. Filed July 1, 1970, Ser. No. 51,663
Int. Cl. C08g 51/58
U.S. Cl. 260—45.7 P                 8 Claims

ABSTRACT OF THE DISCLOSURE

The discoloration of poly(arylene sulfide) resins is minimized or prevented by the addition of a stabilizing amount of an organic phosphite or an organophosphinic acid. Specifically, poly(phenylene sulfide) resins are color stabilized by the addition of phenylphosphinic acid or dioctylphosphite.

---

This invention relates to stabilized poly(arylene sulfide) resins. In one aspect, it relates to poly(arylene sulfide) resins treated with organophosphinic acids to inhibit discoloration. In another aspect, it relates to poly(arylene sulfide) resins treated with organic phosphites to inhibit discoloration. In another aspect, it relates to poly(phenylene sulfide) resins resistant to heat-induced discoloration by virtue of treatment with organophosphinic acids or organic phosphites.

BACKGROUND OF THE INVENTION

Poly(arylene sulfides) which have not been subjected to elevated temperatures, and which do not contain groups capable of imparting color to the polymers are generally white or light colored. However, during high temperature curing, molding, or other heat treatment, the polymers often undergo considerable darkening. This darkening occurs even though air is excluded during the high temperature treatment. For example, although poly(p-phenylene sulfide) does not discolor when subjected to temperatures up to about 290° C. for one hour in a sealed, evacuated container, the polymer does become gray-brown when heated at 365° C. under the same conditions. Since it is frequently desirable to cure these polymers at temperatures as high as 425° C., this curing will result in an undesirable coloration of white or nearly white polymers. The term "curing" as used herein refers to heat treatment of the polymers wherein the molecular weight of the polymer is thus increased.

Furthermore, even cured polymers, i.e., polymers whose molecular weight has been increased by heating and which have been discolored thereby, which are subjected to later heat treatment for the purpose of molding or coating, will undergo even further discoloration. This discoloration is aesthetically undesirable, and limits the application of these resins in certain specific instances.

It is known to inhibit the discoloration of poly(arylene sulfide) resins by the addition thereto of a monothiol or polythiol as disclosed in U.S. Pat. 3,386,950, issued June 4, 1968. It is also known that the discoloration of poly(arylene sulfide) resins can be inhibited by the addition of a hydroxy-substituted amine as disclosed in U.S. Pat. 3,408,342, issued Oct. 29, 1968.

In accordance with the invention, it has been found that organophosphinic acids or organic phosphites inhibit discoloration of poly(arylene sulfide) resins.

Accordingly, it is an object of this invention to provide a method of treating poly(arylene sulfide) resins to reduce their discoloration tendencies.

It is a further object of this invention to provide a poly (arylene sulfide) resin composition with reduced tendency to discolor during heat treatment.

It is another object of this invention to provide a cured poly(arylene sulfide) resin of reduced discoloration.

It is yet another object of this invention to provide a stabilized poly(arylene sulfide) composition.

Other objects and aspects, as well as the several advantages of the invention, will be apparent to those skilled in the art from the accompanying disclosure and appended claims.

STATEMENT OF THE INVENTION

In accordance with the invention, poly(arylene sulfide) resins are stabilized against discoloration by treatment with at least one of an organophosphinic acid and an organic phosphite.

More specifically, according to the invention, poly(phenylene sulfide) resins are treated by incorporating therein an organophosphinic acid or an organic phosphite in an amount sufficient to minimize or prevent discoloration of the resin upon subjecting same to an elevated temperature such as normally employed during heat curing and/or fabrication steps.

Specifically, it has been found that phenylphosphinic acid or dioctylphosphite substantially minimizes discoloration of poly(phenylene sulfide) resins.

DESCRIPTION OF THE PREFERRED EMBODIMENTS

The term "arylene sulfide polymer" as used in this specification is intended to include polymers of the type which are prepared as described in U.S. Pat. 3,354,129, issued Nov. 21, 1967, to Edmonds and Hill. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention, because of their high thermal stability and availability of the materials from which they are prepared, are those polymers having the repeating unit —R—S— where R is phenylene, biphenylene, naphthylene, biphenylene ether or a lower alkyl-substituted derivative thereof. By "lower alkyl" is meant alkyl groups having 1 to 6 carbon atoms such as methyl, propyl, isobutyl, n-hexyl, and the like. The preparation of such polymers is quite well disclosed in the above patent of Edmonds et al.

The polymers of this invention are preferably those which have melting temperatures above about 204° C. These arylene sulfide polymers can have a melting temperature anywhere in the range from 204° C. to 482° C. Polymers of phenylene sulfide normally have melting temperatures in the range from about 288 to 482° C. The preferred polymers have an inherent viscosity in chloronaphthalene at 206° C. of at least 0.1, more preferably between 0.1 and 0.3 and ideally between 0.13 and 0.23.

The invention is broadly applicable to polyarylene sulfides formed by any technique. It can be used, for example, with the resins manufactured as described in U.S. Pat. 2,513,188 prepared by reacting mixtures of p-dichlorobenzene and 1,2,4-trichlorobenzene with sulfur and a metal halide at fusion temperatures. It can also be used with resins manufactured by the method described in British Pat. 962,941 wherein metal salts of halothiophenols are heated at a polymerizing temperature. The invention is especially useful with polymers produced by reacting anhydrous sodium sulfides with polyhalo-substituted cyclic compounds in polar organic solvents as disclosed in U.S. 3,354,129. The invention can be used with linear polymers formed by use of dihalo aromatic compounds or with crosslinked polymers wherein polyhalo aromatic compounds are added to the polymer to aid crosslinking.

The organophosphinic acids that can be employed according to the invention can be represented by the formula

wherein R is either hydrogen or an aryl group with at least one R being an aryl group. The aryl group can be monocyclic or polycyclic, preferably an aryl group containing no more than three rings. The R group includes such radicals as phenyl, tolyl, ethylphenyl, butylphenyl, propyltolyl, ethylhexylphenyl, naphthyl, anthryl, phenanthryl, and the like.

Representative examples of organophosphinic acid that can be employed include phenylphosphinic acid, diphenylphosphinic acid, phenyl(1-naphthyl)phosphinic acid, 8-anthrylphosphinic acid, di(3-phenanthryl)phosphinic acid, 4-eicosylphenylphosphinic acid, di(2,4,6-triethylphenyl)-phosphinic acid, and the like.

The amounts of the organophosphinic acids utilized in the polyphenylene sulfide can vary from about 0.01 to about 20.0 parts by weight per 100 parts of the polymer. A more preferred range is from about 0.25 to about 3.0 parts acid per 100 parts polymer.

The organic phosphites that can be employed according to the invention can be represented by the formula

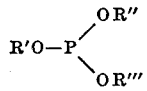

wherein R' is a hydrocarbon group selected from alkyl, aryl, cycloalkyl, alkaryl, and aralkyl groups having from 1 to 20 carbon atoms, and R'' and R''' are selected from R' and hydrogen.

Typical examples of such phosphites include isobutyl phosphite, ethyl phosphite, cyclohexyl phosphite, phenyl phosphite, tridecyl phosphite, eicosyl phosphite, 1-naphthyl phosphite, 2-phenanthryl phosphite, 1-(3,5,7-triethylanthrycyl) phosphite, di(2-phenylethyl) phosphite, di(hexadecyl) phosphite, dicyclopentyl phosphite, dioctyl phosphite, diethyl phosphite, di(tridecyl) phosphite, dibutyl phosphite, diphenyl phosphite, didecyl phosphite, cyclohexyldecylphenyl phosphite, trioctyl phosphite, trimethyl phosphite, triethyl phosphite, tributyl phosphite, triisobutyl phosphite, tri(sec-butyl) phosphite, tri(tert-butyl) phosphite, trihexyl phosphite, tricyclohexyl phosphite, tri(2-ethylhexyl) phosphite, triisooctyl phosphite, tri(tridecyl) phosphite, tri(heptadecyl) phosphite, tri(octadecyl) phosphite, trieicosyl phosphite, phenyldidecyl phosphite, phenyldi(hexadecyl) phosphite, phenyldi(nonadecyl) phosphite, diphenyldecyl phosphite, diphenylheptadecyl phosphite, diphenylnonadecyl phosphite, triphenyl phosphite, tri(p-octylphenyl) phosphite, tri(1-naphthyl) phosphite, tri(2-naphthyl) phosphite, tri(p-dodecylphenyl) phosphite, and the like, e.g., tri(nonylphenyl) phosphite.

Particularly suitable phosphites are di- or trioctyl phosphite, diethyl phosphite, dibutyl phosphite, diphenyl phosphite, and di- or tridecyl phosphite. Of these, dioctyl phosphite is presently preferred.

The amounts of the organic phosphites utilized in the poly(arylene sulfide) resin can vary from about 0.01 to about 20 parts by weight per 100 parts of the polymer. A more preferred range is from 0.25 to about 3 parts organic phosphite per 100 parts polymer.

The organophosphinic acid or organic phosphite can be incorporated in the polymer prior to heat treatment in any convenient manner. For example, the organophosphinic acid or organic phosphite can be added as such to the polymer and the resulting mixture can be agitated in any suitable manner to achieve good mixing.

The stabilizing acid can be added to the polymer in several ways. For example, the acid can be dissolved in a suitable solvent such as acetone, methanol-water, etc. The solution is sprayed on the polymer or slurried with the polymer to distribute the additive. If desired, the treated polymer is given additional mixing in a tumble blender, Henschel mixer, etc., to more thoroughly distribute the additive. The mixing devices mentioned can also be used to blend the powdered acid with the polymer powder. It is also feasible to incorporate the stabilizer in molten resin by using a Banbury mixer, Brabender mixer, extruder, and the like.

It is also within the scope of the invention to admix the polymer and color stabilizing phosphorus compound with suitable plasticizing agents, dyes, fillers, pigments, and the like.

Heat treatment of the polymer and color stabilization or reduction with the phosphorus compounds of the invention can be accomplished by incorporating the phosphorus additive into the polymer and then subjecting the polymer-containing additive to a curing temperature such as an elevated temperature in the range 150–400° C., preferably about 200–370° C., for a period of about one hour to about 24 hours, preferably about three hours to about twelve hours.

The compositions of the invention can be used as coatings on various substrates such as metals and ceramics. The compositions are suitable for preparing many useful articles by injection molding, extrusion and compression molding techniques. Such articles include profiles, mechanical parts, containers and the like.

SPECIFIC EXAMPLE

Color stabilizing additives of the invention were melt blended (one percent by weight) with polyphenylene sulfide for ten minutes under a nitrogen blanket in a Brabender mixer at a temperature of about 290° C. The control was similarly treated. A film, 5 mils thick, was compression molded from each of the samples at about 330° C. under a pressure of 30,000 p.s.i.g. for 30 minutes and then cooled rapidly. The color of each film was visually evaluated according to the Gray Scale For Staining Test devised by the American Association of Textile Chemists and Colorists (AATCC). In this test a gray color is compared with a white standard. A rating of 1 indicates that a sample has changed in color from white to about black. A rating of 5 indicates no change from the white standard. The results are presented in Table I.

TABLE I

| Additive used: | Gray scale rating |
|---|---|
| None (control) | 1.5 |
| Phenylphosphinic acid | 3.5 |
| Dioctyl phosphite | 2.0 |

These data show that the color of polyphenylene sulfide resin subjected to elevated temperatures during melting and molding are reduced by incorporating such additives into the resin prior to the heat treatment. The formulations of Table I containing the additives are suitable for coating applications and the like.

We claim:

1. A color stable composition comprising a polyarylene sulfide resin and a stabilizing amount of at least one phosphorus-containing compound selected from (a) organophosphinic acid as represented by the formula

wherein R is selected from hydrogen and aryl groups with at least one R group being an aryl group, and (b) organic acid phosphites represented by the formula

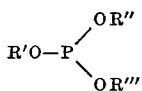

wherein R' is a hydrocarbon group having one to 20 carbons and R" and R'" are selected from R' and hydrogen.

2. A composition according to claim 1 wherein the amount of phosphorus-containing compound present in the resin is in the range 0.01 to 20 parts by weight per 100 parts of the resin.

3. A composition acording to claim 1 wherein the resin is a poly(phenylene sulfide) resin and the phosphorus-containing compound is phenylphosphinic acid.

4. A composition according to claim 1 wherein the resin is a poly(phenylene sulfide) resin and the phosphorus-containing compound is dioctyl phosphite.

5. A heat cured product resulting from the color stable composition of claim 1.

6. A molded product formed from the color stable composition of claim 1.

7. A heat cured product according to claim 5 wherein the resin is poly(phenylene sulfide) and the phosphorus-containing compound is phenylphosphinic acid or dioctyl phosphite.

8. A molded product according to claim 6 wherein the resin is poly(phenylene sulfide) and the phosphorus-containing compound is phenylphosphinic acid or dioctyl phosphite.

References Cited

UNITED STATES PATENTS

| | | | |
|---|---|---|---|
| 3,509,091 | 4/1970 | Cleveland et al. | 260—45.8 |
| 2,553,643 | 5/1951 | Ellerhorst, Jr. | 260—45.7 |
| 2,564,646 | 8/1951 | Leistner et al. | 260—45.7 |
| 2,733,226 | 1/1956 | Hunter | 260—29.7 |
| 3,305,520 | 2/1967 | Fritz et al. | 260—45.7 |
| 3,373,146 | 3/1968 | Meyer et al. | 260—79.7 |
| 3,429,850 | 2/1969 | Holoch | 260—45.9 |
| 3,449,292 | 6/1969 | Snedeker | 260—45.7 |
| 3,489,702 | 1/1970 | Abramoff | 260—18 |
| 3,493,538 | 2/1970 | Salyer et al. | 260—45.95 |

DONALD E. CZAJA, Primary Examiner

R. A. WHITE, Assistant Examiner

U.S. Cl. X.R.

260—79